Nov. 3, 1953     F. K. H. NALLINGER     2,657,778
OPERATING MECHANISM FOR MOTOR VEHICLES
Filed Oct. 3, 1950
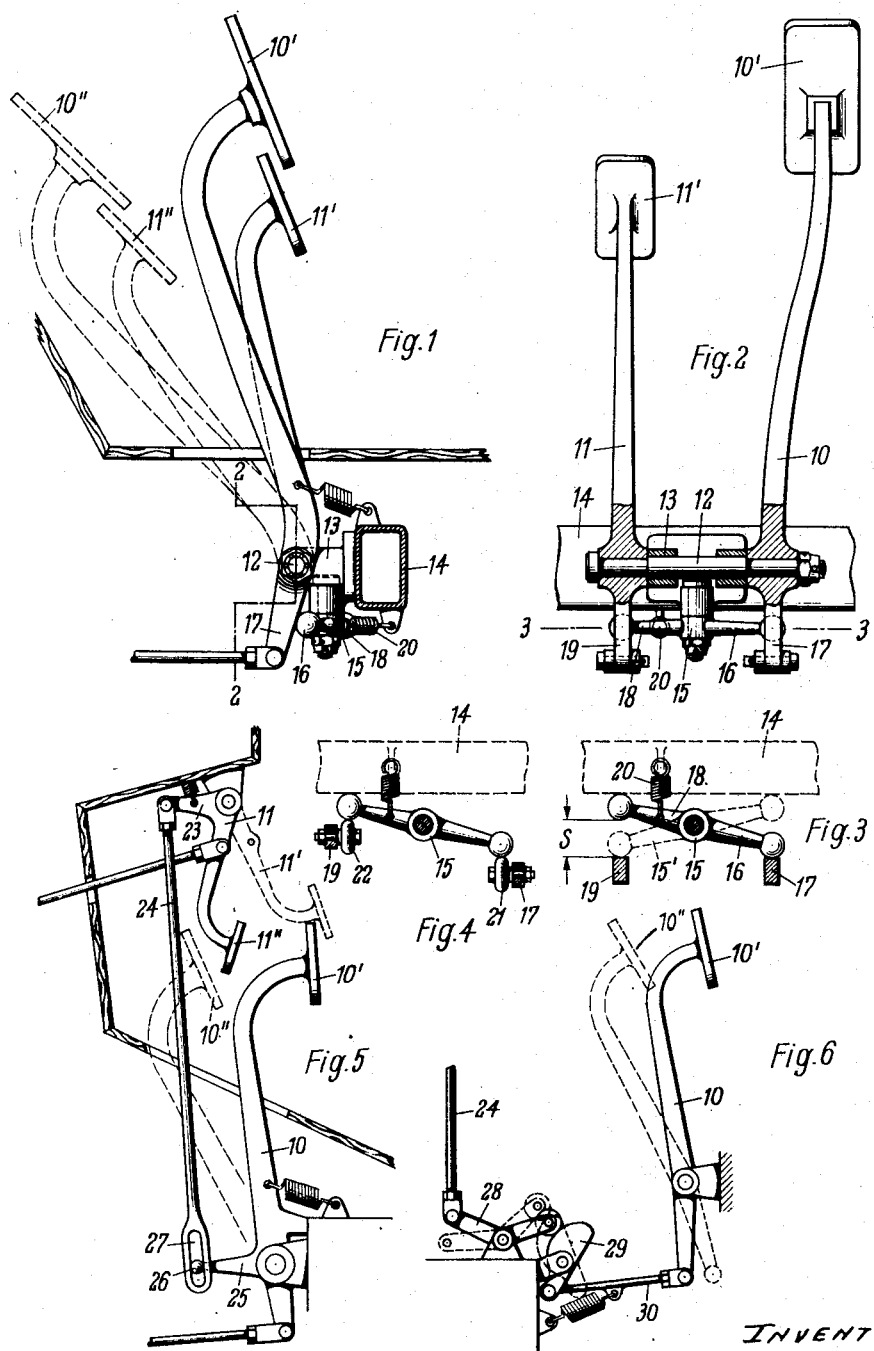
INVENTOR
FRIEDRICH K.H. NALLINGER
BY: Haseltine, Lake & Co.
AGENTS Patented Nov. 3, 1953

2,657,778

UNITED STATES PATENT OFFICE 2,657,778

OPERATING MECHANISM FOR MOTOR VEHICLES

Friedrich K. H. Nallinger, Stuttgart, Germany, assignor to Daimler-Benz Aktiengesellschaft, Stuttgart-Unterturkheim, Germany Application October 3, 1950, Serial No. 188,185
Claims priority, application Germany October 8, 1949

3 Claims. (Cl. 192—3)

The invention refers to an operating mechanism for motor vehicles, particularly for operating a brake operating member and an engine operating member and particularly with automatically shifting clutch. It is above all the subject of the invention to facilitate the operating of the vehicle. Another subject refers to the improving of the driving safety. A vehicle, which is furnished with an automatically shifting clutch has as a rule only two pedals, i. e. a so-called gas or accelerator pedal (engine operating member) and a brake pedal (brake operating member). In this case it is as a rule suitable to operate the brake pedal with the left foot, particularly if it can easily be pressed down by means of a servo effect, and the gas pedal with the right foot. As a consequence of the manner of operating of the usual motor vehicles, in which the left foot has to operate the clutch pedal, many drivers are, however, accustomed to operate the pedal, which is served by the left foot, while the right foot is still simultaneously opening up the engine. In the case of a brake pedal this means, of course, a particularly unsuitable operating, since engine power and braking action work against each other, the braking effect is diminished and the brakes are worn out prematurely.

Particularly for the elimination of these disadvantages an essential characteristic of the invention is a device, by which the brake operating member and the engine operating member, which regulates the power of the engine, are coupled with each other in such a manner that upon operating of the brake, respectively braking, the engine operating member is adjusted to a smaller power, for example no-load power. The mutual dependence is hereby in accordance with a further characteristic of the invention selected in such a manner that the operating members for braking and power regulating (i. e. particularly of a brake pedal and a gas pedal) can simultaneously be brought to their unactuated positions (released brakes respectively idle running), however, at one time only one of the two operating members can be adjusted to full operating (pulled brakes respectively full-load).

According to further subjects of the invention for example both operating members are coupled with each other in a controlled manner by a lever or rods, whereby, however, provision is made for such a play that for example at non-actuating of the operating member (for example of the brake pedal) the other operating member (for example the gas pedal) can carry out its full motion freely.

In the drawing some examples of construction of the invention are figured, i. e.

Figure 1 shows the side view of a brake pedal and of a gas pedal with an intermediate lever transmitting the dependence between both pedals, Figure 2 shows the front view of same, partially in a cut along the line 2—2 of Figure 1, Figure 3 shows a horizontal cut along the line 3—3 of Figure 2, Figure 4 shows a modification of the example in accordance with Figure 3, Figure 5 shows the side view of a brake pedal and of a gas pedal with intermediate rods transmitting the dependence and Figure 6 shows a similar, slightly changed construction.

In the figures, 10 is the brake pedal and 11 the gas or engine operating lever, i. e. 10' and 11' the unactuated, 10'' and 11'' the fully actuated positions. In the example of construction in accordance with Figures 1 through 3 the two pedals are arranged on a common axle 12, which is arranged on a transverse 14 of the framing or of another part of the vehicle by means of a trestle 13. A double-armed intermediate lever 15 with vertical swivelling axis, which is for example supported on the same trestle, is supported with its one arm against the lower arm 17 of the brake pedal 10 and with its other arm 18 against the lower arm 19 of the gas pedal 11, respectively is engaged against these at least then, when one of the pedals is treaded down. If both pedals are released, i. e. into the positions 10' respectively 11', the lever 15, for example at the lever arm 18 opposite the gas pedal, has a free play s between the two pedals. Provision can be made for a spring 20, so that the lever 15 is permanently adjacent to a pedal, for example the brake pedal.

In the Figures 1 through 3 the pedals are shown in unactuated position. In this position one of the two pedals can be treaded down at discretion, without being prevented by the other pedal. If in contrast to this the one of the two pedals, for example the brake pedal 10 is treaded down from the neutral position 10' into the actuated position 10'', whereby the brakes have been brought to effect, the lever 15 has been changed from the fully drawn out position into the position 15', whereby the gas pedal is prevented from being treaded down, or, when it was treaded down before into full-load position 11'', is forced down in a controlled manner from this position into the no-load position 11'.

In the example of construction in accordance with Figure 4 the lever 15 is engaged against the rolls 21, 22 at the lever arms 17, respectively 19 of the pedals. The gas pedal is hereby figured in treaded down position.

In the example of construction in accordance with Figure 5 the gas pedal 11 is suspended. Through a lever arm 23 and rods 24 it is in connection with a lever arm 25 of the brake pedal 10, whereby between the pivots 26 and the rods 24 a play 27 is interposed. If the brake pedal 10 is treaded down from the position 10' into the position 10'', the gas pedal 11 is, as indicated by dash lines, pressed back into the unactuated position 11' by the rods 24, if it was not in this position before. In the latter case the play 27 in the rods permits a treading down of the brake pedal without influencing the gas pedal.

The manner of action corresponds hereby principally to that in accordance with Figures 1 through 3. In the example of construction in accordance with Figure 6 a lever 28 is hinged to the rods 24, which lever acts together with a cam disc or curve guide 29, which in its part is connected to the brake pedal 10 by means of rods 30.

In the figured neutral position 10' of the brake pedal the gas pedal 11 can again be operated in its full motion. If the brake pedal is treaded down, the curve guide 29 effects, if the gas pedal was treaded down before into the position 11'', that the lever 28 is averted in a counterclockwise direction and thereby the gas pedal 11 is averted into the no-load position 11'. Through appropriate shaping of the curve piece 29 any appropriate dependence of the gas pedal on the brake pedal can be achieved; for example the curve can be shaped in such a manner that already in the first part of the treading down of the brake pedal the gas pedal is brought into no-load position and upon further treading down the brake pedal is retained in this position. If the gas pedal is hereby blocked by the curve guide 29 in the no-load position, it cannot be treaded down by force by the driver by forcing back the brake pedal, but only then, if the brake pedal has returned to its neutral position 11' or to a medium position.

In lieu of a cam disk also an axially controlled curve guide, appropriately acting lever rods or the like can be utilized. A dependence of the two pedals respectively of corresponding operating members can also be achieved by utilizing an auxiliary power. The invention is furthermore not restricted to application on pedals, but also applicable to other arrangements operating respectively regulating the brakes respectively the power regulating of the driving engine. It is also not restricted to the utilization for self-acting clutches, even though the invention is in connection herewith of particular importance.

The reconducting of the pedals respectively of the appropriate regulating members into the no-load position can be carried out in all cases in a manner, which is known in itself, for example by appropriate controlling springs or also by hand or the like.

What I claim is:

1. Operating mechanism for motor vehicles comprising a double-armed brake lever, a double-armed fuel supply lever, an actuating foot pedal on a first arm of each lever, spring means for returning the levers to unactuated position, bearing means supporting the levers for pivoting movement about substantially similarly directed axes, a double-armed intermediate lever, bearing means supporting the intermediate lever for pivoting movement about an axis transverse to the pivoting axes of the other levers, and a unitary bearing bracket incorporating both said bearing means, each arm of the intermediate lever being positioned in the path of swinging movement of the second arm of one of the other levers, whereby each said arm of the intermediate lever contacts the cooperating second arm with sufficient play to permit full swinging movement to one of the other levers when not contacted by the other thereof.

2. Operating mechanism for motor vehicles comprising a brake pedal, a fuel supply pedal, spring means for returning the pedals to unactuated position, a double-armed lever, bearing means supporting the pedals and lever for pivoting movement with the pivoting axis of the lever transverse to the pivoting axes of the pedals, an easily removable mounting bracket supporting the bearing means on a fixed part of the vehicle, the arms of the lever being each positioned to contact one of the pedals from the same side and to cooperate therewith with sufficient play in the unactuated position to permit swinging movement of one of the pedals throughout a substantial part of the pivoting range thereof, and spring means urging the lever into operative contact with one of the pedals.

3. Operating mechanism for motor vehicles comprising a brake pedal, a fuel supply pedal, spring means for returning the pedals to unactuated position, a double-armed lever, bearing means supporting the pedals and lever for pivoting movement with the pivoting axis of the lever transverse to the pivoting axes of the pedals, an easily removable mounting bracket supporting the bearing means on a fixed part of the vehicle, the arms of the lever being each positioned to contact one of the pedals from the same side and to cooperate therewith with lost motion corresponding substantially to the stroke of one of the pedals, and spring means urging the lever into operative contact with one of the pedals.

FRIEDRICH K. H. NALLINGER.

References Cited in the file of this patent

UNITED STATES PATENTS

| Number | Name | Date |
|---|---|---|
| 2,229,056 | Dick | Jan. 21, 1941 |
| 2,317,935 | Myerson | Apr. 27, 1943 |
| 2,532,544 | Etnyre | Dec. 5, 1950 |